UNITED STATES PATENT OFFICE.

DAVID O. SAYLOR, OF ALLENTOWN, PENNSYLVANIA.

IMPROVEMENT IN THE MANUFACTURE OF CEMENTS.

Specification forming part of Letters Patent No. 119,413, dated September 26, 1871.

*To all whom it may concern:*

Be it known that I, DAVID O. SAYLOR, of Allentown, in the county of Lehigh and State of Pennsylvania, have invented a new and Improved Cement; and I do hereby declare that the following is a full, clear, and exact description thereof, which will enable others skilled in the art to make and use the same.

I have discovered that some kinds of the argillo-magnesian and also argillo-calcareous limestone found along the Appalachian range, containing more or less carbonate of lime, magnesia, silica, alumina, iron, salts, and alkalies adapted to the purpose, and which are now extensively used in the manufacturing of hydraulic cement, will make, when burned to a stage of incipient vitrification, so as to be agglutinated, warped, or cracked by contraction, and some burned to cinders, a very superior and heavy hydraulic cement, weighing from one hundred and ten pounds to one hundred and twenty pounds per bushel, and in every respect equal to the Portland cement, made in England and imported into this country.

The ordinary cement now in our market, such as Rosendale, Coplay, and other American brands, are burned with the least possible degree of heat. The stage of calcination is arrested before it fuses or is contracted; should any of it do so it is thrown away as worthless. This cement weighs from seventy to ninety pounds per bushel. I propose to burn this stone to the condition above indicated. After this calcination a selection is made and the pulverulent and scarified portions of the mass are picked out and thrown away. The remainder is then passed through a crusher; then through a mill consisting of ordinary sand or burrstone. The manufactured material is then placed in a layer of from two to three feet thick over the floor of a cool shed and left exposed to the air for about four weeks before it is fit to use.

The stone which I use for the purpose contains the same ingredients as the composition used for making the Portland cement, and the products cannot be distinguished from each other except by treatment.

Having thus described my invention, I claim as new and desire to secure by Letters Patent—

1. The process for making hydraulic cement from argillo-magnesian and argillo-calcareous limestone, substantially as herein specified and described.

2. As an improved article of manufacture, hydraulic cement produced from argillo-magnesian and argillo-calcareous limestone, substantially as herein specified and described.

Witnesses:               DAVID O. SAYLOR.
   EDWIN ALBRIGHT,
   AUGUSTUS WEBER.                (92)